United States Patent
Zhou et al.

(10) Patent No.: US 9,365,019 B2
(45) Date of Patent: Jun. 14, 2016

(54) APPARATUS FOR FORMING HYDROPHOBIC STRUCTURES IN POROUS SUBSTRATES

(71) Applicant: Xerox Corporation, Norwalk, CT (US)

(72) Inventors: Jing Zhou, Pittsford, NY (US); Mandakini Kanungo, Penfield, NY (US); Nancy Y. Jia, Webster, NY (US); Wei Hong, Amherst, MA (US)

(73) Assignee: Xerox Corporation, Norwalk, CT (US)

( * ) Notice: Subject to any disclaimer, the term of this patent is extended or adjusted under 35 U.S.C. 154(b) by 31 days.

(21) Appl. No.: 14/312,061

(22) Filed: Jun. 23, 2014

(65) Prior Publication Data
US 2015/0367615 A1 Dec. 24, 2015

(51) Int. Cl.
| | | |
|---|---|---|
| *B32B 37/00* | (2006.01) | |
| *B05C 11/00* | (2006.01) | |
| *B32B 37/06* | (2006.01) | |
| *B32B 37/04* | (2006.01) | |
| *B32B 37/10* | (2006.01) | |
| *B32B 37/18* | (2006.01) | |
| *B30B 15/06* | (2006.01) | |

(52) U.S. Cl.
CPC ............ *B32B 37/0046* (2013.01); *B05C 11/00* (2013.01); *B32B 37/04* (2013.01); *B32B 37/06* (2013.01); *B01L 2300/0887* (2013.01); *B30B 15/062* (2013.01); *B32B 37/10* (2013.01); *B32B 37/18* (2013.01); *B32B 2307/728* (2013.01); *B32B 2307/73* (2013.01); *B32B 2309/02* (2013.01); *B32B 2535/00* (2013.01)

(58) Field of Classification Search
CPC .... B32B 37/0046; B32B 37/04; B32B 37/06; B32B 37/10; B32B 37/18; B05C 11/00
USPC .............. 156/358, 359, 366, 580, 583.1
See application file for complete search history.

(56) References Cited

U.S. PATENT DOCUMENTS

| | | | |
|---|---|---|---|
| 4,606,264 A | | 8/1986 | Agronin et al. |
| 6,092,578 A | * | 7/2000 | Machida ................. B29C 43/56 156/358 |
| 6,458,236 B2 | * | 10/2002 | Takeshita ........... H05K 13/0469 156/306.9 |
| 7,267,938 B2 | | 9/2007 | Anderson et al. |
| 8,377,710 B2 | | 2/2013 | Whitesides et al. |
| 8,574,924 B2 | | 11/2013 | Sia et al. |
| 8,603,832 B2 | | 12/2013 | Whitesides et al. |

(Continued)

OTHER PUBLICATIONS

Bracher et al.; Patterned paper as a template for the delivery of reactants in the fabrication of planar materials; The Royal Society of Chemistry Journal; Jun. 10, 2010; pp. 4303-4309.

(Continued)

*Primary Examiner* — James Sells
(74) *Attorney, Agent, or Firm* — Maginot Moore & Beck LLP

(57) ABSTRACT

An apparatus for distributing a hydrophobic material in a hydrophilic substrate includes a first plate, a second plate, a heater operatively connected to the first plate and configured to heat the first plate to a first temperature that is greater than a second temperature of the second plate, and an actuator configured to move the first plate and second plate together with a hydrophilic substrate between the plates. The first plate and second plate form a temperature gradient to enable a hydrophobic material on one side of a hydrophilic substrate that faces the second plate to penetrate into the hydrophilic substrate towards the first plate.

16 Claims, 6 Drawing Sheets

(56) References Cited

U.S. PATENT DOCUMENTS

| | | | |
|---|---|---|---|
| 8,627,867 B2* | 1/2014 | Lahood | B32B 37/0046 156/358 |
| 2010/0145491 A1 | 6/2010 | Troian | |
| 2011/0111517 A1 | 5/2011 | Siegel et al. | |
| 2011/0123398 A1 | 5/2011 | Carrilho et al. | |
| 2012/0198684 A1 | 8/2012 | Carrilho et al. | |
| 2012/0328905 A1 | 12/2012 | Guo et al. | |
| 2013/0034869 A1 | 2/2013 | Whitesides et al. | |

OTHER PUBLICATIONS

Martinez et al.; Diagnostics for the Developing World: Microfluidic Paper-Based Analytical Devices; Analytical Chemistry; Jan. 1, 2010; pp. 3-10; vol. 82, Issue No. 1; American Chemical Society.

* cited by examiner

APPARATUS FOR FORMING HYDROPHOBIC STRUCTURES IN POROUS SUBSTRATES

TECHNICAL FIELD

This disclosure relates generally to systems and methods for controlling the deposition of a hydrophobic material in a porous substrate and, more particularly, to systems and methods for forming a hydrophobic material in paper as part of a chemical assay or biomedical testing device to control diffusion of a fluid through the substrate.

BACKGROUND

Paper-based chemical assay devices include a paper substrate, wax that forms fluid channels and other fluid structures in the paper, and one or more reagents. Common examples of paper-based chemical assay devices include biomedical testing devices that are made of paper and perform biochemical assays and diagnostics in test fluids such as blood, urine and saliva. The devices are small, lightweight and low cost and have potential applications as diagnostic devices in healthcare, military and homeland security to mention a few.

FIG. 7A and FIG. 7B depict the prior art processes for melting wax that is formed on a paper substrate in a reflow oven. The melting process is required for the wax to penetrate into the paper instead of remaining in a layer on the surface of the paper. In FIG. 7A, a reflow oven heats a paper substrate with solidified wax to a temperature of approximately 150° C. The entire paper and the wax are heated to the same temperature in an isotropic manner. As depicted in FIG. 7B, the wax melts and spreads both into the porous paper and across the surface of the paper in a roughly uniform manner. The prior art reflow oven cannot control the direction of flow for the melted wax, and the melted wax tends to spread across the surface of paper to a greater degree than is desired. In a biomedical testing device, the wax is formed in lines and other structures that act as barriers and channels to fluids that diffuse through the paper substrate. The uncontrolled spread of the wax presents difficulties in forming the barriers and liquid channels with precise shapes. Consequently, improvements to the control the flow of a hydrophobic material that is deposited on a porous substrate would be beneficial.

SUMMARY

In one embodiment an apparatus for distributing a hydrophobic material in a hydrophilic substrate has been developed. The apparatus includes a first plate, a second plate, a heater operatively connected to the first plate, and an actuator operatively connected to at least one of the first plate and the second plate. The heater is configured to heat a surface of the first plate to a first temperature that enables heating through a first side of a first hydrophilic substrate having a thickness of not more than 1 millimeter to melt a first layer of a hydrophobic material formed a second side of the first hydrophilic, the first layer of the hydrophobic material having a thickness of not more than 0.4 millimeters and the first temperature being greater than a second temperature of another surface of the second plate. The actuator is configured to move the first plate and the second plate together for a dwell time of approximately 0.1 seconds to 10 seconds to enable the surface of the first plate to engage the first side of the first hydrophilic substrate and to enable the other surface of the second plate to engage the second side of the first hydrophilic substrate to enable the melted layer of hydrophobic material to penetrate the first hydrophilic substrate.

In another embodiment an apparatus for distributing a hydrophobic material in a hydrophilic substrate has been developed. The apparatus includes a first plate, a second plate, a heater operatively connected to the first plate, and an actuator operatively connected to at least one of the first plate and the second plate. The heater is configured to heat a surface of the first plate to a first temperature that enables heating through a first side of a first hydrophilic substrate to melt a first layer of a hydrophobic material formed on a second side of the first hydrophilic substrate and further heating through a first side of a second hydrophilic substrate that engages the first layer of the hydrophobic material to melt a second layer of the hydrophobic material formed on a second side of the second hydrophilic substrate, the first hydrophilic substrate and the second hydrophilic substrate each being not more than 1 millimeter thick, the first temperature of the surface of the first plate being sufficient to melt the first layer of the hydrophobic material and the second layer of the hydrophobic material, the first layer of the hydrophobic material and the second layer of the hydrophobic material each having a thickness of not more than 0.4 millimeters, and the first temperature being greater than a second temperature of another surface of the second plate. The actuator is configured to move the first plate and the second plate together for a dwell time of approximately 0.1 seconds to 10 seconds to enable the surface of the first plate to engage the first side of the first hydrophilic substrate and to enable the other surface of the second plate to engage the second side of the second hydrophilic substrate to enable the first melted layer of hydrophobic material to penetrate both the first hydrophilic substrate and the second hydrophilic substrate and the second layer of the hydrophobic material to penetrate the second hydrophilic substrate.

BRIEF DESCRIPTION OF THE DRAWINGS

The foregoing aspects and other features of an apparatus that controls the distribution of a hydrophobic material on a substrate are explained in the following description, taken in connection with the accompanying drawings.

DETAILED DESCRIPTION

Figure 1A:
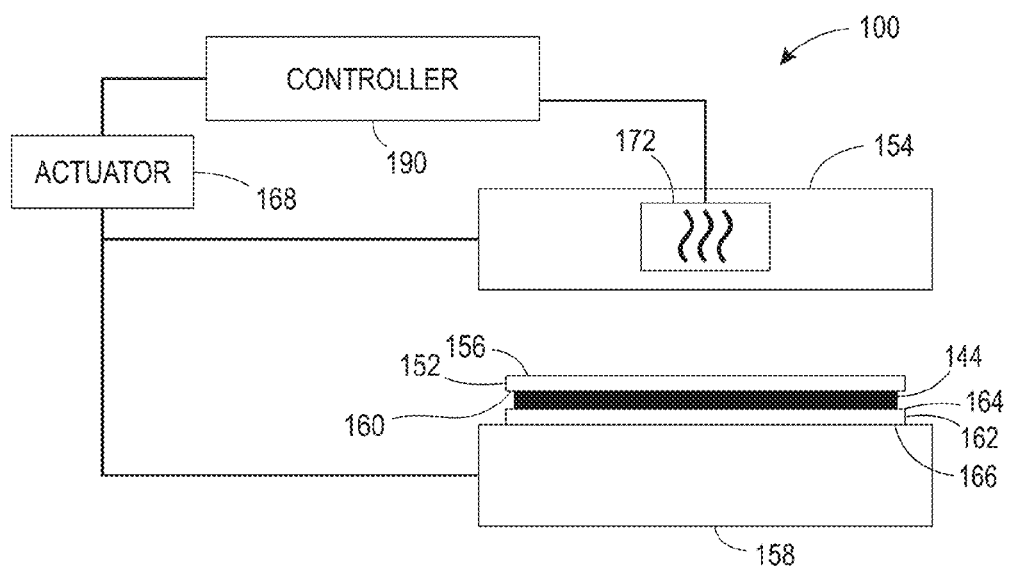
FIG. 1A is a diagram of an apparatus that applies a temperature gradient and pressure to a substrate to control a distribution of a hydrophobic material through the substrate.

For a general understanding of the environment for the system and method disclosed herein as well as the details for the system and method, reference is made to the drawings. In the drawings, like reference numerals have been used throughout to designate like elements.

As used herein, the terms "hydrophilic material" and "hydrophilic substrate" refer to materials that absorb water and enable diffusion of such fluids through the hydrophilic material via capillary action. One common example of a hydrophilic substrate is paper, such as cellulose filter paper, chromatography paper, or any other suitable type of paper. The hydrophilic substrates are formed from porous and/or high surface energy materials that enable water and other biological fluids that include water, blood, urine, saliva, and other biological fluids, to diffuse into the substrate. The porous material in the hydrophilic substrate also absorbs liquefied hydrophobic materials such as melted wax or melted phase-change ink that penetrate the substrate and solidify to form hydrophobic structures in the substrate. Examples of hydrophobic structures include, but are not limited to, arrangements of the hydrophobic material that penetrate the hydrophilic substrate to form fluid barriers, fluid channel walls, and other hydrophobic elements that control the diffusion of fluid in the hydrophilic substrate. Additionally, in some configurations the hydrophobic material penetrates two hydrophilic substrates to bond the substrates together. As described below, a hydrophobic material is embedded in the hydrophilic substrate to form channels and barriers that control the diffusion of the fluid through the hydrophilic substrate.

As used herein, the term "hydrophobic material" refers to any material that resists adhesion to water and is substantially impermeable to a flow of water through capillary motion when in a solid. When embedded in a porous substrate, such as paper, the hydrophobic material acts as a barrier to prevent the diffusion of water through portions of the substrate that include the hydrophobic material. The hydrophobic material also acts as a barrier to many fluids that include water, blood, urine, saliva, and other biological fluids. As described below, the hydrophobic material is embedded in a porous substrate to form channels and other structures that control the capillary diffusion of the liquid through the substrate. In one embodiment, the substrate also includes biochemical reagents that are used to test various properties of a fluid sample. The hydrophobic material forms channels to direct the fluid to different locations in the substrate that have deposits of the chemical reagents. The hydrophobic material is also substantially chemically inert with respect to the fluids in the channel to reduce or eliminate chemical reactions between the hydrophobic material and the fluids. A single testing fluid diffuses through the channels in the substrate to react with different reagents in different locations of the substrate to provide a simple and low-cost device for performing multiple biochemical tests.

As used herein, the term "phase-change material" refers to a form of hydrophobic material with a solid phase at room temperature and standard atmospheric pressure (e.g. 20° C. and one atmosphere of pressure) and a liquid phase at an elevated temperature and/or pressure level. Examples of phase-change materials used herein include wax and phase-change ink. As used herein, the term "phase-change ink" refers to a type of hydrophobic phase-change material in the form of an ink that is substantially solid at room temperature but softens and liquefies at elevated temperatures. Some inkjet printers eject liquefied drops of phase-change ink onto indirect image receiving surfaces, such as a rotating drum or endless belt, to form a latent ink image. The latent ink image is transferred to a substrate, such as a paper sheet. Other inkjet printers eject the ink drops directly onto a print medium, such as a paper sheet or an elongated roll of paper. In a liquid state, the phase-change material can penetrate a porous substrate, such as paper. Examples of phase-change inks that are suitable for use in forming fluid channels and other hydrophobic structures in hydrophilic substrates include solid inks that are sold commercially by the Xerox Corporation of Norwalk, Conn. Wax is another example of a phase change material that is also a hydrophobic material. Phase-change inks and wax inks are examples of hydrophobic materials that can be formed into channels and other hydrophobic structures in a hydrophilic substrate to control the capillary diffusion of fluids in the hydrophilic substrate.

As used herein, the term "plate" refers to a member with a surface that is configured to engage one side of substrate where at least the portion of the surface of the plate that engages the substrate is substantially smooth and planar. In some embodiments, the surface of the plate engages an entire side of the substrate. As described below, two plates apply a temperature gradient and pressure to two sides of one substrate or either end of a stack of substrates. When one plate is heated to have a uniform surface temperature that is sufficiently high to melt one or more layers of a hydrophobic phase-change material, the hydrophobic material penetrates one or more layers of the substrate to form fluid channels in the substrate. When one plate is heated to an elevated temperature while the other plate remains at a lower temperature, the melted hydrophobic material flows towards the higher-temperature plate to a greater degree than the lower temperature plate.

As used herein, the term "dwell time" refers to an amount of time that a substrate spends in an apparatus to receive heat and pressure from plates in the apparatus to enable a hydrophobic material to penetrate the substrate. The dwell time is selected to enable the hydrophobic material to penetrate the substrate to form liquid channels and other structures in the substrate. The selected dwell time can vary based on the thickness and porosity of the substrate, the temperature gradient between the plates in the apparatus, the pressure between the plates in the apparatus, and the viscosity characteristics of the hydrophobic material.

Figure 1B:
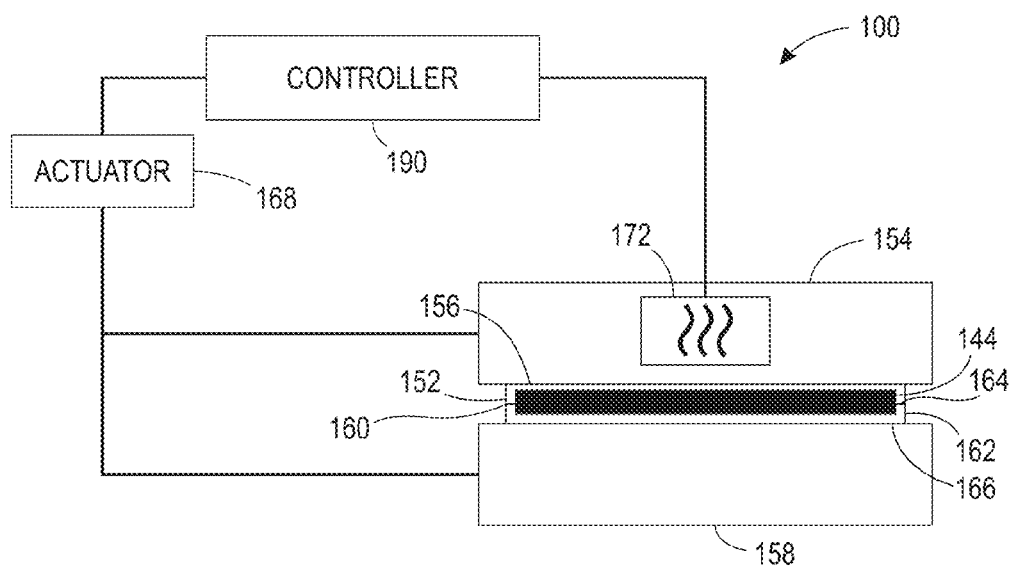
FIG. 1B is a diagram of the apparatus of FIG. 1A during application of the temperature gradient and pressure to the substrate to control distribution of the hydrophobic material through the substrate.

FIG. 1A and FIG. 1B depict an apparatus 100 that is configured to a temperature gradient and pressure to a hydrophilic substrate, such as paper, to enable a flow of a hydrophobic material into pores of the substrate to form barriers and channels that control diffusion of a fluid through the hydrophilic substrate. In the configuration of FIG. 1A, two plates 154 and 158 are separated to enable insertion and removal of a first substrate 152 that includes a first side 156 and a second side 160 bears a layer of hydrophobic material 144. In FIG. 1A and FIG. 1B, an optional second substrate 162 is placed between the first substrate 152 and the second plate 158. The second substrate 162 includes a first side 164 that engages the layer of hydrophobic material 144 and the second side 160 of the first substrate 152 and a second side 166 that engages the second plate 158. In the configuration of FIG. 1B, the two plates 154 and 158 engage each other to apply a temperature gradient and pressure to the substrates 152 and 162 to enable the hydrophobic material layer 144 to melt and to penetrate into the substrate 152 and form fluid channels in the substrate 152 and to bond the substrates 152 and 162 together. As used herein, a reference to the term "apparatus," unless expressly referred to otherwise, refers to a device that applies a heat gradient and pressure to a substrate to enable a hydrophobic material formed on a surface of the substrate to flow into the substrate with an anisotropic spread pattern.

The apparatus 100 includes the first plate 154, second plate 158, a heater 172, and actuator 168, and a controller 190 that is operatively connected to the heater 172 and the actuator 168. During operation, the hydrophilic substrate 152 that bears the layer of hydrophobic material 144 and the second substrate 162 are positioned between the plates 154 and 158. The plates 154 and 158 are both substantially flat and smooth in the regions that engage the substrate 152 to enable the plates 154 and 158 to apply uniform temperature gradient and pressure to the substrates 152 and 162 and the layer of hydrophobic material 144. In some embodiments, either or both of the plates 154 and 158 are coated with a release agent, such as silicone oil, that reduces the adhesion of the hydrophilic substrates, hydrophobic material, or other residual materials to the surfaces of the plates 154 and 158. The plates 154 and 158 are, for example, formed from stainless steel, other suitable metallic plates, or a ceramic material and have sufficient length and width to form an area that is large enough to engage the substrates 152 and 162.

In the apparatus 100, the heater 172 is, for example, an electric heater that raises a temperature of the surface of the first plate 154 that engages the first side 156 of the substrate 152 to a first predetermined temperature. In different configurations of the apparatus 100, the heater 172 heats the first plate 154 to a temperature range of approximately 70° C. to 140° C., although alternative embodiments use different temperatures for different combinations of hydrophobic materials and substrates. In some embodiments, the controller 190 adjusts the heater 172 to vary the temperature of the first plate 154 during operation of the apparatus 100. The second plate 158 remains at a lower temperature than the first plate. In some embodiments, the surface of the second plate 158 has a temperature that is close to the ambient temperature around the apparatus 100 (e.g. 20° C.-25° C.). Thus, the two plates 154 and 158 form a temperature gradient where the first plate 154 is at the high end of the temperature gradient and the second plate 158 is at the low end of the temperature gradient.

In the apparatus 100, the actuator 168 is, for example, an electromechanical, hydraulic, or pneumatic device that moves the plates 154 and 158 apart, as depicted in FIG. 1A, and moves the plates 154 and 158 together to apply a temperature gradient and pressure to the substrate 152 and hydrophobic material 144, as depicted in FIG. 1B. In one embodiment of the apparatus 100 the actuator 168 moves both of the plates 154 and 158, in another embodiment the actuator moves only one of the plates 154 or 158 while the other plate remains in a fixed location, and in still other embodiments multiple actuators are used to move one or both of the plates 154 and 158. In different configurations of the apparatus 100, the actuator 168 applies pressure in a range of 800 pounds per square inch (PSI) to 3,000 PSI, although alternative embodiments can use a different pressure level. The pressure between the plates 154 and 158 lowers the melting temperature of the hydrophobic material 144 and assists in diffusion of the hydrophobic material 144 into the substrate 152. The controller 190 optionally varies the level of pressure that is applied while the substrate 152 remains between the plates 154 and 158.

In the apparatus 100, a digital electronic control unit (ECU), which is depicted as the controller 190, is operatively connected to the actuator 168 and the heater 172. The controller 190 is, for example, a digital computing device including one or more microprocessors, microcontrollers; field programmable gate arrays (FPGAs), application specific integrated circuits (ASICs), or any other suitable digital logic devices. The controller 190 typically incorporates a memory that stores programmed instructions. The controller 190 executes the stored program instructions to control the operation of the heater 172 and the actuator 168 to apply a temperature gradient and pressure to one or more substrates and the associated layers of hydrophobic material in the apparatus 100. In some embodiments, the heater 172 includes an array of individual heating elements that heat the surface of the plate 154 in a uniform manner to generate a predetermined operating temperature. The controller 190 is optionally connected to one or more temperature sensors that measure the temperature on different regions of the first plate 154, and the controller 190 adjusts the operation of heating elements in the heater 172 in different regions of the plate 154 to maintain a uniform temperature.

During operation, the controller 190 operates the actuator 168 to separate the plates 154 and 158 as depicted in FIG. 1A. The substrate 152 is placed between the plates 154 and 158 with the hydrophobic material layer 144 engaging the lower temperature second plate 158. The controller 190 subsequently operates the actuator 168 to engage the first plate 154 and second plate 158, as depicted in FIG. 1B. The controller 190 operates the heater 172 to heat the first plate 154 to the predetermined temperature and operates the actuator 168 to apply pressure to the substrates 152 and 162 with the plates 154 and 158.

In the apparatus 100, the controller 190 is configured to control the operation of the heater 172 to bring the surface of the first plate 154 to a predetermined temperature within the temperature range (e.g. 70° to 140° C.) and pressure (e.g. 800 PSI to 3,000 PSI) that enables the apparatus to melt the hydrophobic material 144 on the substrate 152 in a controlled manner to form the fluid channels in the hydrophilic substrate 152. The temperature and pressure levels are selected based on the thickness of the substrate, thickness and melting temperature of the hydrophobic material and, in some embodiments, the number of substrate and hydrophobic material layers that are stacked between the plates 154 and 158.

The controller 190 maintains the temperature gradient and pressure between the plates 154 and 158 on the substrate 152 for a predetermined dwell time to enable the hydrophobic material 144 to melt and penetrate into the substrate 152. In one configuration of the device 100, the controller 190 activates the heater 172 to heat the first plate to a temperature that enables the hydrophilic substrates 152 and 162 to each have a thickness of up to 1 millimeter and for the layer of hydrophobic material 144 to have a thickness of up to 0.4 millimeters. In some embodiments, the thickness for the hydrophobic material 144 is approximately 0.05 millimeters. The controller 190 applies the temperature gradient and pressure between the plates 154 and 158 for a dwell time of approximately 0.1 seconds to 10 seconds to melt the hydrophobic material and enable the hydrophobic material 144 to penetrate the substrates 152 and 162.

As depicted in FIG. 1A and FIG. 1B, the layer of hydrophobic material 144 engages the surface of the second substrate 162. As described in more detail below, a larger portion of the hydrophobic material 144 penetrates the first substrate 152 to form the fluid channels due to the temperature gradient between the higher temperature first plate 154 and the lower temperature second plate 158. A smaller portion of the hydrophobic material 144 penetrates the second substrate 162 to bond the substrates 152 and 162 together. The second substrate 162 is referred to as a carrier or sacrificial substrate that is optionally removed from the first substrate 152 by peeling or another form of mechanical separation after the apparatus 100 forms the fluid channels in the first substrate 152. The second substrate 162 reduces or eliminates contamination of the second plate 158 with residue from the hydrophobic material and optionally forms a protective layer on the first substrate 152. The second substrate 162 is not strictly required to enable the hydrophobic material in the layer 144 to penetrate the first substrate 152 and form the fluid channels. In another embodiment, the second side 160 of the first substrate 152 and the layer of hydrophobic material 144 are placed directly on the lower temperature second plate 158.

Figure 2:
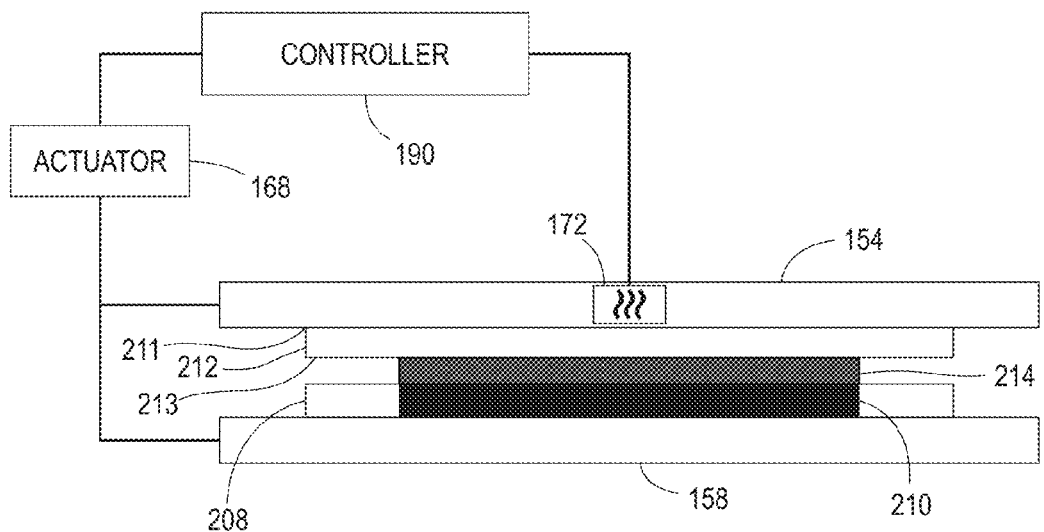
FIG. 2 is a diagram of another embodiment of the apparatus that applies heat and pressure to bond two substrates together with a hydrophobic material.

FIG. 2 depicts another configuration of the apparatus 100 that bonds multiple substrates together to form a bonded stack of substrates. In FIG. 2, two hydrophilic substrates 208 and 212 are stacked between the plates 154 and 158 in the apparatus 100. The substrate 208 has a layer of the hydrophobic material 210 that has previously been formed through the thickness of the substrate 208 to form fluid channel walls and other hydrophobic structures within the hydrophilic substrate 208. In one embodiment, the plates 154 and 158 apparatus 100 applied the temperature gradient and pressure to form the fluid channels as described above in FIG. 1. The second substrate 212 is another hydrophilic substrate that is arranged with a first side 211 engaging the surface of the first plate 154 and a second side 213 bearing another layer of the hydrophobic material 214. The temperature gradient and pressure between the plates 154 and 158 melts the hydrophobic material 214 and enables the hydrophobic material 214 to penetrate both the substrates 208 and 212. Due to the temperature gradient between the plates 154 and 158, a larger portion of the hydrophobic material 214 penetrates into the substrate 212 to form fluid channel walls and other hydrophobic structures within the substrate 212. A smaller portion of the hydrophobic material 214 penetrates into the substrate 208 to bond the two substrates 208 and 212 together. After being exposed to the temperature gradient and pressure between the plates 154 and 158, portion of the hydrophobic material 214 remains between the two substrates 208 and 214 to maintain the bond between the substrates.

In the configuration of FIG. 2, the controller 190 maintains the temperature gradient and pressure between the plates 154 and 158 on the substrates 208 and 212 for a predetermined dwell time to enable the hydrophobic material 214 to melt and penetrate into the substrates 208 and 212. In one configuration of the device 100, the controller 190 activates the heater 172 to heat the first plate to a temperature that enables the hydrophilic substrate 212 with a thickness of up to 1 millimeter bearing a layer of hydrophobic material 214 with a thickness of up to 0.4 millimeters. In other embodiments, the thickness of the hydrophilic substrate is approximately 0.1 to 0.2 millimeters and the thickness of each layer of the hydrophobic material is approximately 0.05 millimeters.

The controller 190 maintains the temperature of the surface of the first plate 154 at a level of between 70° and 140° C., and operates the actuator 168 to apply pressure at a level of between 800 PSI and 3,000 PSI in the illustrative embodiment of FIG. 2. The thickness of the substrate 208 or a stack of previously bonded substrates can vary in a comparatively wide range (e.g. up to 1 cm or thicker) because during the bonding process only the layer of hydrophobic material 214 that is closest to the heated first plate 154 is required to melt and penetrate into the two substrates that are most proximate to the heated first plate 154. The controller 190 applies the temperature gradient and pressure to the substrates 208 and 212 between the plates 154 and 158 for a dwell time of approximately 0.1 seconds to 10 seconds to melt the hydrophobic material 214 and enable the melted hydrophobic material 214 to penetrate into the substrates 208 and 212.

In one embodiment, the controller 190 operates the heater 172 to set the temperature of the first plate 154 in the configuration of FIG. 2 to the same temperature of the first plate 154 in the configuration of FIG. 1. In another embodiment, the controller 190 operates the heater 172 to set the temperature of the first plate 154 in the configuration of FIG. 2 lower than the temperature in the configuration of FIG. 1 to melt the second layer of hydrophobic material 214 for bonding the two substrates 208 and 212 without having the second layer of hydrophobic material 214 fully penetrate the substrate 212. In one configuration, the controller 190 operates the heater 172 at a lower temperature when the substrate layer 212 is a sacrificial or carrier substrate that can be removed from the substrate 208 at a later time. In still another embodiment, the controller 190 operates the heater 172 to set the temperature of the first plate 154 in the configuration of FIG. 2 to a higher temperature than in the configuration of FIG. 1. The higher temperature setting is used to reduce the dwell time for the stack of substrates between the plates 154 and 158 in some embodiments.

While FIG. 2 depicts bonding of two substrates together, the same process can apply to bonding a single substrate to a larger stack of substrates. For example, to form a stack of three substrates, the two bonded substrates 208 and 212 are placed between the plates 154 and 158 with another substrate that bears another layer of the hydrophobic material positioned between the second substrate 212 and the first plate 154. The apparatus 100 then applies heat and pressure to bond the additional substrate and form hydrophobic structures in the additional substrate. The apparatus 100 is configured to continue bonding layers as one additional layer is added to a previously formed stack to form a multi-layer device.

Figure 3:
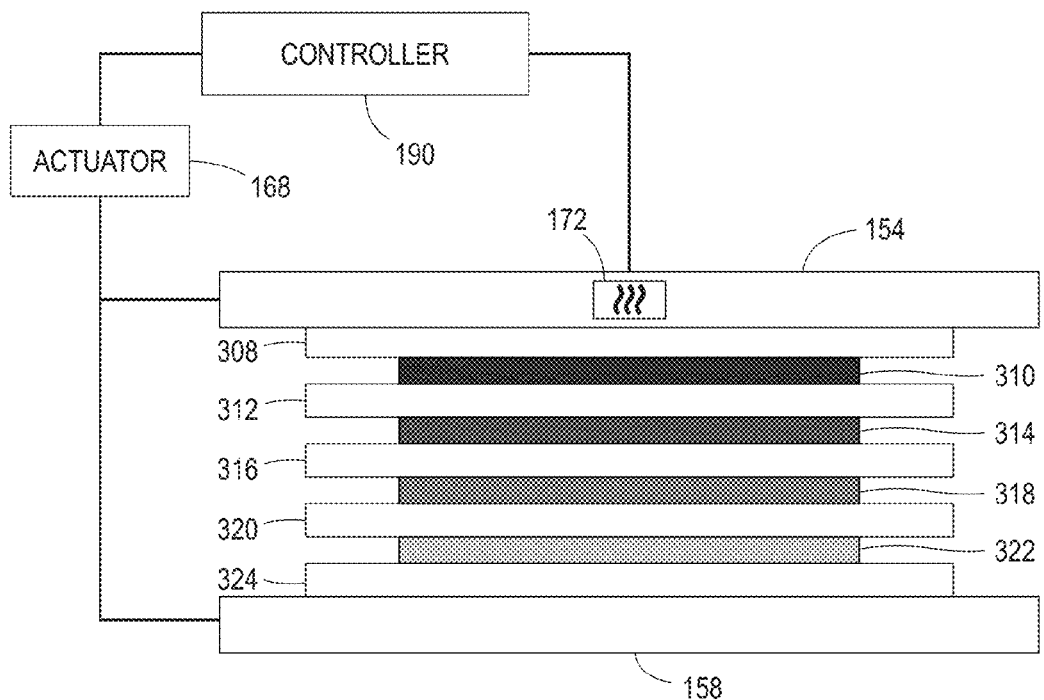
FIG. 3 is a diagram of another embodiment of the apparatus that applies heat and pressure to a stack of hydrophilic substrates that have hydrophobic material layers.

FIG. 3 depicts another configuration of the apparatus 100 of FIG. 1A and FIG. 1B that applies a temperature gradient and pressure to a stack of multiple substrates to control the distribution of hydrophobic material through the substrates and to bond the substrates together. The apparatus 100 in FIG. 3 applies pressure and a temperature gradient to the hydrophobic material layers 310, 314, 318, and 322 and the stacked substrates 308, 312, 316, 320, 324 in a similar manner to the configuration of FIG. 1.

In the configuration of FIG. 3, a portion of the hydrophobic material in layer 310 penetrates the substrate 308 to form fluid channels in the substrate 308 in a similar manner to the hydrophobic layer 144 and substrate 152 in FIG. 1. Another portion of the hydrophobic material in the layer 310 penetrates the substrate 312 to bond the substrates 308 and 312 together. Because the higher temperature plate 154 is positioned on the side of the substrate 308 opposite the hydrophobic material layer 310, a larger portion of the hydrophobic material in the layer 310 penetrates the substrate 308 than the substrate 312. In the illustrative embodiment of FIG. 3, the hydrophobic material layer 314 penetrates the substrate 312 to form fluid channels and the substrate 316 to bond the substrates 312 and 316 together in a similar manner. The hydrophobic layer 318 penetrates the substrate 316 to form fluid channels and the substrate 320 to bond the substrates 316 and 320 together, and the hydrophobic layer 322 penetrates the substrate 320 to form fluid channels and the substrate 324 to bond the substrates 320 and 324 together. While FIG. 3 depicts four layers of hydrophobic material, the apparatus 100 can be configured to form fluid channels and bond together substrates in different combinations using at least two substrates and at least one layer of the hydrophobic material.

In one embodiment, the hydrophobic layers 310, 314, 318, and 322 are formed from hydrophobic phase change materials that are formulated with different melting temperatures. The layer 310 has the highest melting temperature, and the layers 314, 318, and 322 have progressively lower melting temperatures, with the layer 322 that is farthest from the heated first plate 154 having the lowest melting temperature. The different melting temperatures for the hydrophobic layers 310, 314, and 318 enable uniform penetration for each of the hydrophobic layers into the corresponding substrates to form fluid channels and bond the substrates together based on the temperature gradient that is formed between the plates 154 and 158. For example, the hydrophobic layer 310 is positioned closest to the higher temperature plate 154 and has the highest melting point, while the hydrophobic layers 314 and 318 have progressively lower melting points since these layers are positioned at locations in the stack that experience lower temperatures along the temperature gradient. The dwell time for the two plates 154 and 158 is sufficient to melt each of the layers of hydrophobic material 310, 314, 318, and 322 to enable each layer to penetrate the respective surrounding substrate layers 308, 312, 316, 320, and 324 to form fluid channels and bond the hydrophilic substrates together.

In the configuration of FIG. 3, the substrate 324 is an example of a sacrificial or carrier substrate because the substrate 324 does not include additional fluid channels that are formed from the hydrophobic material. The sacrificial substrate 324 prevents direct contact between the hydrophobic material in layer 322 and the second plate 158, which reduces or eliminates contamination of the plate 158 with residual hydrophobic material. Additionally, in some embodiments the sacrificial substrate 324 forms a protective cover over the fluid channels in the substrate layer 320. In some embodiments, the sacrificial substrate 324 is separated from the bonded layers 308, 312, 316, and 320 after the stack is removed from the plates 154 and 158.

In the configuration of FIG. 3, the controller 190 maintains the temperature gradient and pressure between the plates 154 and 158 on the substrates 308, 312, 316, 320, and 324 for a predetermined dwell time to enable the hydrophobic material in the layers 310, 314, 318, and 322 to melt and penetrate into the substrates. In one configuration of the device 100, the controller 190 activates the heater 172 to heat the first plate to a temperature that enables each of the hydrophilic substrates to have a thickness of up to 1 millimeter and each of the hydrophobic material layers to have a thickness of up to 0.4 millimeters for each of the hydrophobic material layers. The controller 190 maintains the temperature of the surface of the first plate 154 at a level of between 70° and 140° C., and operates the actuator 168 to apply pressure at a level of between 800 PSI and 3,000 PSI in the illustrative embodiment of FIG. 3. The controller 190 applies the temperature gradient and pressure to the stacked substrates 308, 312, 316, 320, and 324 between the plates 154 and 158 for a dwell time of approximately 0.1 seconds to 10 seconds to enable the melted hydrophobic material layers 310, 314, 318, and 322 to penetrate into the substrates.

Figure 4:
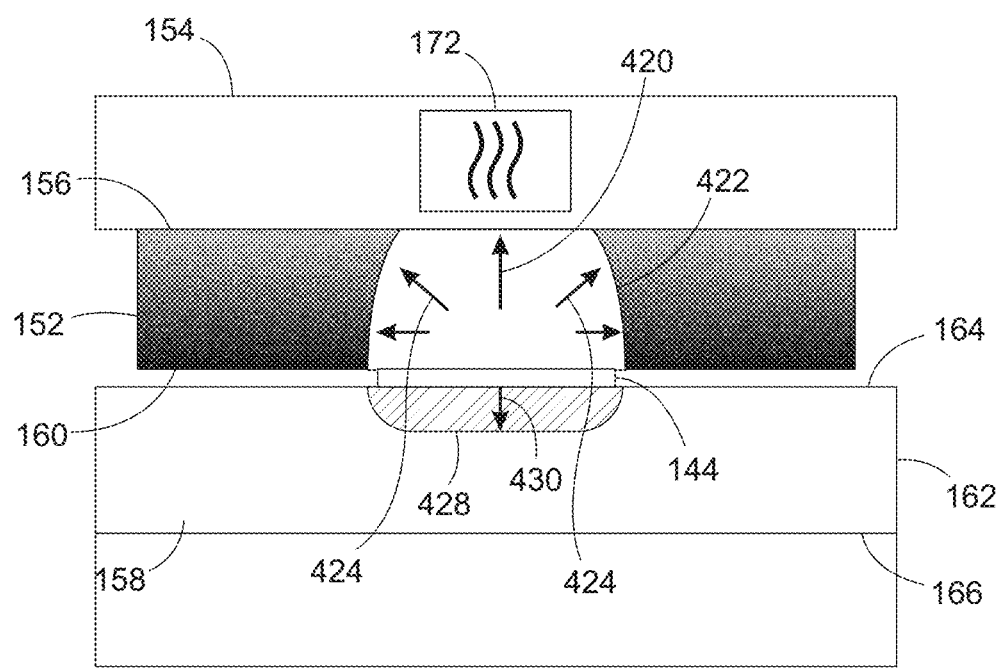
FIG. 4 is a diagram depicting a temperature gradient that is formed in the apparatus of FIG. 1 or FIG. 2 to enable the hydrophobic material to penetrate the substrate.

FIG. 4 depicts the penetration of the hydrophobic material 144 into the substrates 152 and 162 in more detail. The elevated temperature and pressure between the plates 154 and 158 melt the solidified hydrophobic material 144 and the liquefied hydrophobic material spreads both horizontally and vertically into the porous material in the substrate 152. In addition to a larger portion 422 of the hydrophobic material that penetrates into the first substrate 152, a smaller portion 428 penetrates into the second substrate 162. The spreading distance L of the liquefied hydrophobic material is provided by Washburn's equation:

$$L = \sqrt{\frac{\gamma D t}{4\eta}}$$

where $\gamma$ is the surface tension of the melted hydrophobic material 144, D is the pore diameter of pores in the substrate 152, t is the dwell time of the substrate 152 between the plates 154 and 158 during which the temperature gradient and pressure between the plates 154 and 158 reduce the viscosity of the hydrophobic material 144, and $\eta$ is the viscosity of the melted hydrophobic material in a liquid state. The surface tension $\gamma$ and viscosity $\eta$ terms are empirically determined from the properties of the hydrophobic material 144. The pore diameter D is empirically determined from the type of paper or other hydrophilic material that forms the substrate 152.

The controller 190 in the apparatus 100 has direct or indirect control over viscosity $\eta$ of the hydrophobic material as the hydrophobic material and substrate flows through the temperature gradient that is produced between the plates 154 and 158. The controller 190 also has control over the dwell time t during which the plates 154 and 158 engage each other around one or more substrates. Hydrophobic materials such as wax or phase-change inks transition into a liquid state with varying levels of viscosity based on the temperature of the material and pressure applied to the hydrophobic material. The viscosity of the liquefied hydrophobic material is inversely related to the temperature of the material. The temperature gradient reduces the viscosity of the hydrophobic material in the higher-temperature region near the side 156 and plate 154 to a greater degree than on the lower-temperature side 160, which engages the lower-temperature plate 158 indirectly through the thickness of the second hydrophilic substrate 162. Thus, the temperature gradient enables the phase change material in the higher temperature regions of the temperature gradient to penetrate a longer distance compared to the phase change material in the lower-temperature regions due to the reduced viscosity at increased temperature.

As is known in the art, the pressure applied between the plates 154 and 158 also reduces the effective melting temperature of the hydrophobic material 144 so that the temperature levels required to melt and reduce the viscosity level of the hydrophobic material 144 are lower than the melting temperature at standard atmospheric pressure. As the plates 154 and 158 are separated, the hydrophobic material 144 cools and solidifies within the substrate 152 to form fluid channels.

The temperature gradient formed between the plates 154 and 158 produces anisotropic heating of the melted hydrophobic material 144. The higher temperature of the first plate 154 on the first side 156 reduces the viscosity $\eta$ of the hydrophobic material 144 to a greater degree than on the lower-temperature side 160. Thus, the temperature gradient enables the hydrophobic material 144 to flow into the porous material of the substrate 152 toward the first side 156 for a longer distance than the horizontal flow of the hydrophobic material 144 along the length of the substrate 152. In FIG. 4, the longer arrow 420 depicts the longer distance of flow L for the hydrophobic material 144 through the porous material in the substrate toward the high temperature side 156 of the substrate 152, while the shorter arrows 424 indicate a shorter flow distance along the length of the substrate 152. Similarly, in the second substrate 162 the shorter arrow 430 shows the smaller degree of penetration into the second substrate 162 because the melted ink does not flow toward the surface of the lower-temperature second plate 158 to the same degree as the surface of the higher temperature first plate 154. A portion of the hydrophobic material in the hydrophobic layer 144 remains between the substrates 152 and 162 to maintain the bond between the two substrates. For a phase-change ink hydrophobic material, the reduced viscosity η of the ink as the ink penetrates the substrate 152 towards the higher temperature plate 154 enables the phase-change ink to penetrate through the substrate from the printed surface on the second side 160 to the first side 156, which forms a layer of the phase-change ink through the entire thickness of the substrate 152.

Figure 7A:
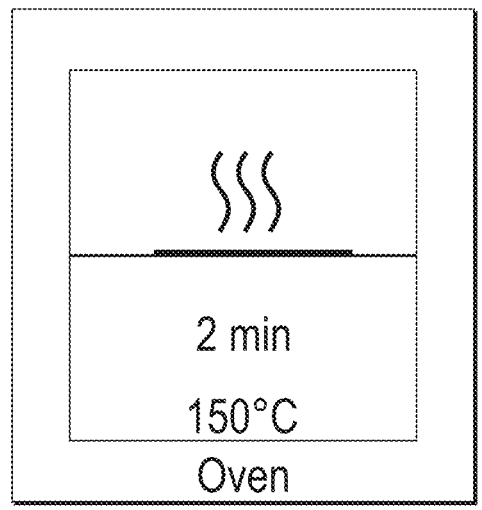
FIG. 7A is a diagram of a prior art reflow oven that melts a hydrophobic material formed on a surface of a substrate.
Figure 7B:
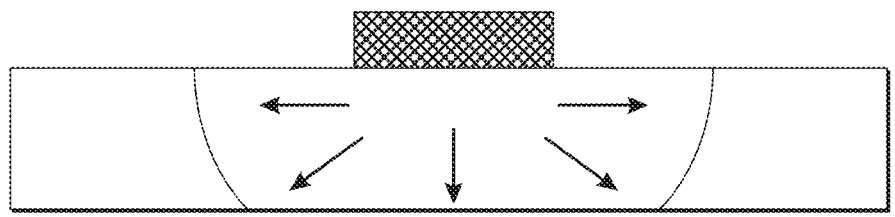
FIG. 7B is a diagram depicting the spread of hydrophobic material on a substrate in the reflow oven of FIG. 7A in a prior art spreading process.

The apparatus 100 generates the anisotropic temperature gradient and liquid flow patterns for the hydrophobic material 144 to form printed lines and other printed features with the hydrophobic material 144 that exhibit less spread along the lateral direction of the substrate 152 and improved penetration through the substrate 152 from the printed side 160 to the blank side 156. For example, in one embodiment the horizontal width of a printed channel barrier line that is formed with the apparatus 100 is approximately 650 μm while the prior-art reflow oven embodiment of FIG. 7A spreads the same printed line to a width of approximately 1000 μm. Furthermore, the anisotropic temperature gradient in the apparatus 100 enables the hydrophobic material 144 to penetrate into the substrate 152 to a greater degree than the prior art reflow oven with the isotropic temperature distribution depicted in FIG. 7B. The narrower width of the barriers enables the production of smaller devices with finer feature details, and also improves the quality and the effectiveness of the fluid channels that control the capillary diffusion of fluids through the substrate.

Figure 5:
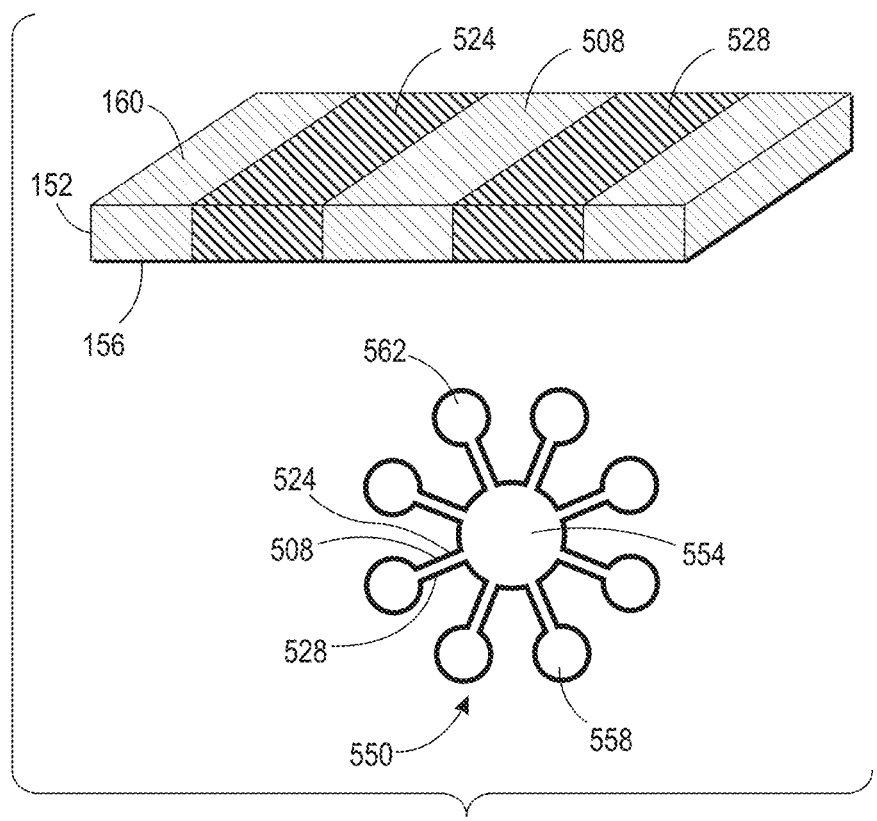
FIG. 5 is a cross-sectional view and a plan view of a biomedical test device formed in a substrate with fluid channels in the substrate that are formed by the hydrophobic material.

FIG. 5 depicts an example of a pattern of a hydrophobic material in a chemical assay device. In the illustrative embodiment of FIG. 5, the chemical assay device is a biomedical test device 550 that forms a deposit location and fluid channels in the substrate to direct the fluid to different locations where chemical reagents react with the fluid. The substrate 152 includes the barriers 524 and 528 that are formed from the hydrophobic material 144. The apparatus 100 enables the hydrophobic material 144 to penetrate through the thickness of the substrate 152 from the second side 160 toward the first side 156 to form the barriers 524 and 528 that fully surround a fluid channel 508. The hydrophilic substrate 152 absorbs a fluid test sample and the fluid moves through the channel 508 through capillary diffusion, while the barriers 524 and 528 prevent the fluid from leaving the channel 508. The biomedical detection device 550 includes the substrate 152, the hydrophobic barriers that are formed in the substrate to control the diffusion of fluids, a deposit site 554, and a set of reaction sites, also known as well, such as the reaction sites 558 and 562. During operation, a fluid sample is deposited in the central deposit site 554. While not depicted in FIG. 5, a mask layer is typically formed over the printed device 550 to ensure that fluid samples are only absorbed at the deposit site 554. The fluid sample propagates through the hydrophilic substrate 152 through the channels that are formed by the hydrophobic material and to an array of reaction sites. Each of the reaction sites includes a chemical reagent that is embedded in the substrate 152. The chemical reagents react with different chemical compounds in the fluid sample and change color or produce another indicator that can be used to analyze the fluid sample. For example, the reaction site 558 tests for anemia while the reaction site 562 tests for the glucose (blood sugar) level in a single blood sample that is placed in the deposit site 554.

The substrate 550 in FIG. 5 depicts a single substrate layer with fluid channels that are formed from the hydrophobic material. Some biomedical sensors and other devices that receive fluid using a porous substrate include multiple substrates that are bonded together as depicted by the configuration of FIG. 3. In a multi-layer device, each of the substrate layers optionally includes a different set of fluid channels that are formed from the hydrophobic material. The multi-layer devices guide the flow of fluid in three dimensions through multiple layers of the substrates.

Figure 6:
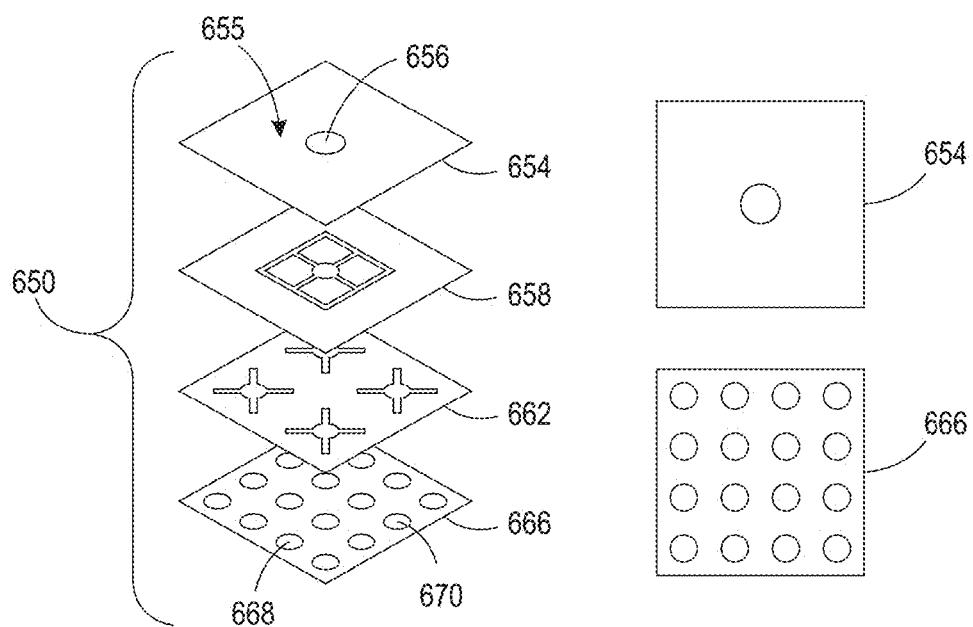
FIG. 6 is an exploded view of a biomedical test device formed from a plurality of substrates with fluid channels in each of the substrate that are formed by the hydrophobic material.

FIG. 6 depicts an example of a multi-layer biomedical testing device 650 that includes four substrates 654, 658, 662, and 666. The biomedical testing device 650 is an example of a chemical assay device that includes multiple hydrophilic substrates and layers of hydrophobic material that form fluid channels in the hydrophilic substrates and bond the hydrophilic substrates together. The apparatus 100 forms the fluid channels and bonds the hydrophilic substrates together to form the biomedical testing device 650.

In the biomedical testing device 650, each of the substrates includes fluid channels that are formed from hydrophobic material, and the substrates are bonded together to form the biomedical testing device 650. As described above in FIG. 1 and FIG. 2, the apparatus 100 forms the fluid channels from the hydrophobic layers and bonds the layers together a single layer at a time to form the biomedical testing device 650. In the embodiment of FIG. 3, the apparatus 100 applies the temperature gradient and pressure to the stacked substrates to form the fluid channels and bond the substrates together. In the illustrative example of the biomedical device 650, the layer 654 is an inlet layer with a region 655 that is formed from the hydrophobic material and a deposit site 656 that is formed from the bare paper substrate and receives drops of a biomedical fluid. The hydrophobic material in the region 655 seals the biomedical device 650 from one side and controls the diffusion of biomedical fluids that are placed on the deposit site 656. The layers 658 and 662 each include patterns of the hydrophobic material that form intermediate fluid channels that direct the fluid from the inlet layer 654 to different test sites in the layer 666. For example, the test site 668 includes a chemical reagent that tests for protein levels in a blood sample and the test site 670 includes a chemical reagent that tests for glucose levels in the blood sample. The pattern of the hydrophobic material on the substrate layer 666 forms barriers to prevent diffusion of the fluid between the test sites and enables the substrate layer 666 to be bonded to the substrate layer 662.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An apparatus for distributing a hydrophobic material in a hydrophilic substrate comprising:
a first plate;
a second plate;
a heater operatively connected to the first plate only;
an actuator operatively connected to at least one of the first plate and the second plate; and
a controller operatively connected to the heater and the actuator, the controller being configured to:
activate the heater to heat a surface of the first plate to a first temperature that enables heating through a first side of a first hydrophilic substrate having a thickness of not more than 1 millimeter to melt a first layer of a hydrophobic material formed a second side of the first hydrophilic, the first layer of the hydrophobic material having a thickness of not more than 0.4 millimeters and the first temperature being greater than a second temperature of another surface of the second plate; and operate the actuator to move the first plate and the second plate together for approximately 0.1 seconds to 10 seconds to enable the surface of the first plate to engage the first side of the first hydrophilic substrate only when the first plate and second plate are moved together and to enable the other surface of the second plate to engage the second side of the first hydrophilic substrate to enable the melted layer of hydrophobic material to penetrate the first hydrophilic substrate.

2. The apparatus of claim 1, the controller being further configured to:

operate the heater to heat the first plate to the first temperature in a range of approximately 70° C. to 140° C.

3. The apparatus of claim 1, the controller being further configured to:

operate the actuator to move the first plate and the second plate together to apply a predetermined level of pressure to the first hydrophilic substrate and the melted layer of the hydrophobic material.

4. The apparatus of claim 3 wherein the predetermined level of pressure is in a range of approximately 800 pounds per square inch (PSI) to 3,000 PSI.

5. The apparatus of claim 1, the controller being further configured to:

operate the heater to generate the first temperature for the surface of the first plate to enable the melted hydrophobic material in the layer of hydrophobic material to penetrate the first hydrophilic substrate to form fluid channels in the first hydrophilic substrate.

6. The apparatus of claim 1 the controller being further configured to:

operate the heater to heat the surface of the first plate to the first temperature that enables heating through a first side of a second hydrophilic substrate engaging the second side of the first hydrophilic substrate and the layer of hydrophobic material and a second side of the second hydrophilic substrate engaging the other surface of the second plate, the second substrate having a thickness of not more than 1 millimeter, to enable a portion of the melted layer of hydrophobic material to penetrate the second hydrophilic substrate and bond the second hydrophilic substrate to the first hydrophilic substrate.

7. The apparatus of claim 1, the controller being further configured to:

operate the heater to heat the surface of the first plate to a third temperature that enables heating through a first side of a second hydrophilic substrate that engages the surface of the first plate and a second side of the second hydrophilic substrate that bears a second layer of the hydrophobic material that engages the first side of the first hydrophilic substrate after the first layer of the hydrophobic material has penetrated the first hydrophilic substrate, the second hydrophilic substrate having a thickness of not more than 1 millimeter to melt the second layer of hydrophobic material, the second layer of the hydrophobic material having a thickness of not more than 0.4 millimeters and the third temperature being greater than the second temperature of the other surface of the second plate.

8. The apparatus of claim 7 wherein the first temperature is the same as the third temperature.

9. The apparatus of claim 7 wherein the third temperature is lower than the first temperature.

10. The apparatus of claim 7 wherein the third temperature is higher than the first temperature.

11. An apparatus for distributing a hydrophobic material and bonding a plurality of hydrophilic substrates comprising:

a first plate;
a second plate;
a heater operatively connected to the first plate only;
an actuator operatively connected to at least one of the first plate and the second plate and
a controller operatively connected to the heater and the actuator, the controller being configured to:

operate the heater to heat a surface of the first plate to a first temperature that enables heating through a first side of a first hydrophilic substrate to melt a first layer of a hydrophobic material formed on a second side of the first hydrophilic substrate and further heating through a first side of a second hydrophilic substrate that engages the first layer of the hydrophobic material to melt a second layer of the hydrophobic material formed on a second side of the second hydrophilic substrate, the first hydrophilic substrate and the second hydrophilic substrate each being not more than 1 millimeter thick, the first temperature of the surface of the first plate being sufficient to melt the first layer of the hydrophobic material and the second layer of the hydrophobic material, the first layer of the hydrophobic material and the second layer of the hydrophobic material each having a thickness of not more than 0.4 millimeters, and the first temperature being greater than a second temperature of another surface of the second plate; and operate the actuator to move the first plate and the second plate together for approximately 0.1 seconds to 10 seconds to enable the surface of the first plate to engage the first side of the first hydrophilic substrate only when the first plate and second plate are moved together and to enable the other surface of the second plate to engage the second side of the second hydrophilic substrate to enable the first melted layer of hydrophobic material to penetrate both the first hydrophilic substrate and the second hydrophilic substrate and the second layer of the hydrophobic material to penetrate the second hydrophilic substrate.

12. The apparatus of claim 11, the controller being further configured to:

operate the heater to generate the first temperature for the surface of the first plate to melt the first layer of the hydrophobic material having a first melting temperature and to melt the second layer of the hydrophobic material having a second melting temperature, the first melting temperature being greater than the second melting temperature.

13. The apparatus of claim 11, the controller being further configured to:

operate the heater to generate the first temperature for the surface of the first plate to enable a first portion of the melted hydrophobic material in the first layer of hydrophobic material to penetrate the second hydrophilic substrate to bond the first hydrophilic substrate to the second hydrophilic substrate and enables a second portion of the melted hydrophobic material in the first layer of hydrophobic material to penetrate the first hydrophilic substrate to form fluid channels in the first hydrophilic substrate.

14. The apparatus of claim 11 wherein the first temperature is in a range of approximately 70° C. to 140° C.

15. The apparatus of claim 14, the controller being further configured to:
   operate the actuator to move the first plate and the second plate together with a predetermined pressure to enable the first plate and the second plate to urge the first layer of hydrophobic material into the first hydrophilic substrate and the second hydrophilic substrate and the second layer of hydrophobic material in the second hydrophilic substrate.

16. The apparatus of claim 15 wherein the predetermined pressure is in a range of approximately 800 pounds per square inch (PSI) to 3,000 PSI.

* * * * *